United States Patent [19]

Henning

[11] Patent Number: 4,615,069
[45] Date of Patent: Oct. 7, 1986

[54] APPARATUS FOR COLLECTING DEBRIS

[75] Inventor: Brian Henning, Tetbury, England

[73] Assignee: Black & Decker Inc., Newark, Del.

[21] Appl. No.: 663,059

[22] Filed: Oct. 19, 1984

[51] Int. Cl.[4] .......................... A47L 5/14; A47L 5/24; A47L 9/08; A47L 9/14
[52] U.S. Cl. ...................................... 15/326; 15/330; 15/405; 15/409
[58] Field of Search ................. 15/409, 330, 344, 408, 15/350, 326

[56] References Cited

U.S. PATENT DOCUMENTS

| | | | |
|---|---|---|---|
| 1,802,920 | 4/1931 | Lee | 15/330 |
| 2,024,367 | 12/1935 | Jons | 15/330 |
| 2,375,331 | 5/1945 | Taylor | 15/330 |
| 2,902,708 | 9/1959 | Riley | 15/330 |
| 2,923,959 | 2/1960 | Huber | 15/330 |
| 3,460,327 | 7/1966 | Johnson . | |
| 3,506,998 | 4/1970 | Perry | 15/409 X |
| 3,525,118 | 8/1970 | Viollet | 15/409 X |
| 3,564,641 | 2/1971 | Meyer | 15/326 |
| 3,964,123 | 6/1976 | Pettersson . | |
| 4,288,886 | 9/1981 | Siegler . | |
| 4,290,165 | 9/1981 | Hiramatsu et al. | 15/330 |

FOREIGN PATENT DOCUMENTS

| | | | |
|---|---|---|---|
| 1022770 | 1/1958 | Fed. Rep. of Germany | 15/409 |
| 2402866 | 7/1974 | Fed. Rep. of Germany . | |
| 156568 | 9/1982 | Fed. Rep. of Germany . | |
| 843511 | 7/1939 | France | 15/409 |
| 12937 | of 1906 | United Kingdom | 15/330 |
| 294961 | 1/1929 | United Kingdom | 15/330 |
| 1211930 | 11/1970 | United Kingdom | 15/330 |
| 1331064 | 9/1973 | United Kingdom . | |

OTHER PUBLICATIONS

European Search Report-3-21-84.

Primary Examiner—Harvey C. Hornsby
Assistant Examiner—Scott J. Haugland
Attorney, Agent, or Firm—Edward D. Murphy; Harold Weinstein; Edward D. C. Bartlett

[57] ABSTRACT

A debris collecting apparatus includes a debris conduit (2) one end of which is an operating end (4) and the other end of which is a collecting end with a collecting bag (6) attached thereto. An impeller (8) discharges air into a straight part of the conduit. A switch arrangement is provided to switch the air flow between first "vacuum" flow in which air discharged from the impeller induces an air flow in the debris conduit (2) from the operating end (4) to the collecting end and a second "blowing" flow in which air is discharged from the impeller through the operating end.

14 Claims, 7 Drawing Figures

APPARATUS FOR COLLECTING DEBRIS

BACKGROUND OF THE INVENTION

1. Field of the Invention

This invention relates to a debris collecting apparatus, and in particular, but not exclusively, an apparatus for collecting garden debris, of the kind which may be used either in a vacuum mode to suck debris into the apparatus or in a blowing mode to discharge a stream of air from a nozzle so that debris can be blown into piles.

2. Brief Description of the Prior Art

Such debris collecting apparatus is already known. In one such apparatus, a centrifugal impeller is used to blow air through an outlet to which, in the blowing mode, a length of pipe is connected. To operate the apparatus in the vacuum mode, the pipe is disconnected from the outlet of the impeller and connected to its central inlet; in this mode, debris passes through the impeller which will inevitably result in wear to the impeller even though a chopping blade may be mounted on the impeller shaft immediately upstream of the impeller.

In another form of apparatus, air is discharged longitudinally in a jet into the centre of a first tube at a location where a second tube is joined at right angles. In the vacuum mode of the device, air is drawn from the second tube into the first by the jet of air; debris is sucked into an open end of the second tube and passes from there into the first tube to a collecting bag. In the blowing mode, the first tube is closed downstream of the junction with the first tube so that the air discharged into the first tube is forced to travel up the second tube and is blown out of its open end. This apparatus avoids the problem of passing debris through the impeller but there is a danger of debris becoming stuck as it passes from the second tube into the first in the vacuum mode. The very nature of garden rubbish including long thin objects such as twigs makes this is is a real problem.

SUMMARY OF THE INVENTION

It is an object of the invention to provide an improved form of debris collector that can be operated in the vacuum or blowing mode.

According to the invention, there is provided a debris collecting apparatus including a debris conduit one end of which is an operating end and the other end of which is a collecting end, an impeller arranged to discharge air into the conduit in a region where the conduit is devoid of any sudden and substantial change in direction, a switch arrangement to switch the air flow between a first "vacuum" flow in which the air discharged from the impeller induces an air flow in the debris conduit from the operating end to the collecting end and a second "blowing" flow in which air is discharged from the impeller through the operating end.

An arrangement of this kind has the advantage that while it is still possible to use the apparatus either as a vacuum device or as a blower, the debris conduit can be designed without any corners or obstructions where debris might become trapped.

Preferably air is discharged into the conduit from the side with a component of its flow towards the collection end of the conduit. Introducing the air flow from the side of the conduit does not impede the passage of debris along the conduit. The air may be discharged through one or more openings in the side of the conduit; if desired the air may be discharged into the conduit in a ring around the whole of the conduit.

The debris conduit is preferably substantially inflexible and substantially straight in the region where air is discharged into the conduit and preferably along its whole length. Flexibility is undesirable as any bend in the debris conduit can result in twigs or other objects being stuck in the conduit.

The impeller may be a cross flow fan and may be driven by an electric motor.

In one embodiment of the invention a debris collector in the form of a collecting bag is removably connected to the collecting end of the conduit and the switch arrangement is held in the "blowing" flow position when the collecting bag is detached from the collecting end of the apparatus.

The switch arrangement may comprise a valve member which is inoperative in a first position corresponding to "vacuum" flow but which when switched to a second position corresponding to "blowing" flow blocks the debris conduit between a point at which air is discharged into the conduit and the collecting end. The valve member may be located in the discharge region and may be shaped to direct the air discharged into the conduit towards the operating end. This improves the efficiency of the apparatus in the blowing mode.

Alternatively, the switch arrangement may comprise an air flow guide movable between a first position corresponding to "vacuum" flow in which the air discharged from the impeller induces an air flow in the debris conduit from the operating end to the collecting end and a second position corresponding to "blowing" flow in which air is discharged from the impeller through the air flow guide into the conduit and is diverted by the guide to flow towards the operating end of the conduit.

The air flow guide may comprise one or more vanes carried on a member slidably mounted in the conduit wall.

In an embodiment to be described the conduit wall has an opening through which air is discharged into the conduit by the impeller. In its first position, the air flow guide leaves the opening substantially unblocked but in its second position the vanes are located in the opening. In an advantageous arrangement, in its first position, a part of the air flow guide is arranged to guide air discharged into the debris conduit.

According to another aspect of the invention, there is provided a debris collecting apparatus including a debris conduit one end of which is an operating end and the other end of which is a collecting end, an impeller arranged to discharge air into the conduit, an air flow guide movable between a first position corresponding to "vacuum" flow in which the air discharged from the impeller induces an air flow in the debris conduit from the operating end to the collecting end and a second position corresponding to "blowing" flow in which air is discharged from the impeller through the air flow guide into the conduit and is diverted by the guide to flow towards the operating end of the conduit.

BRIEF DESCRIPTION OF THE DRAWINGS

By way of example, an embodiment of the invention will now be described with reference to the accompanying drawings, of which.

DETAILED DESCRIPTION OF THE PREFERRED EMBODIMENTS OF THE INVENTION

Figure 1:
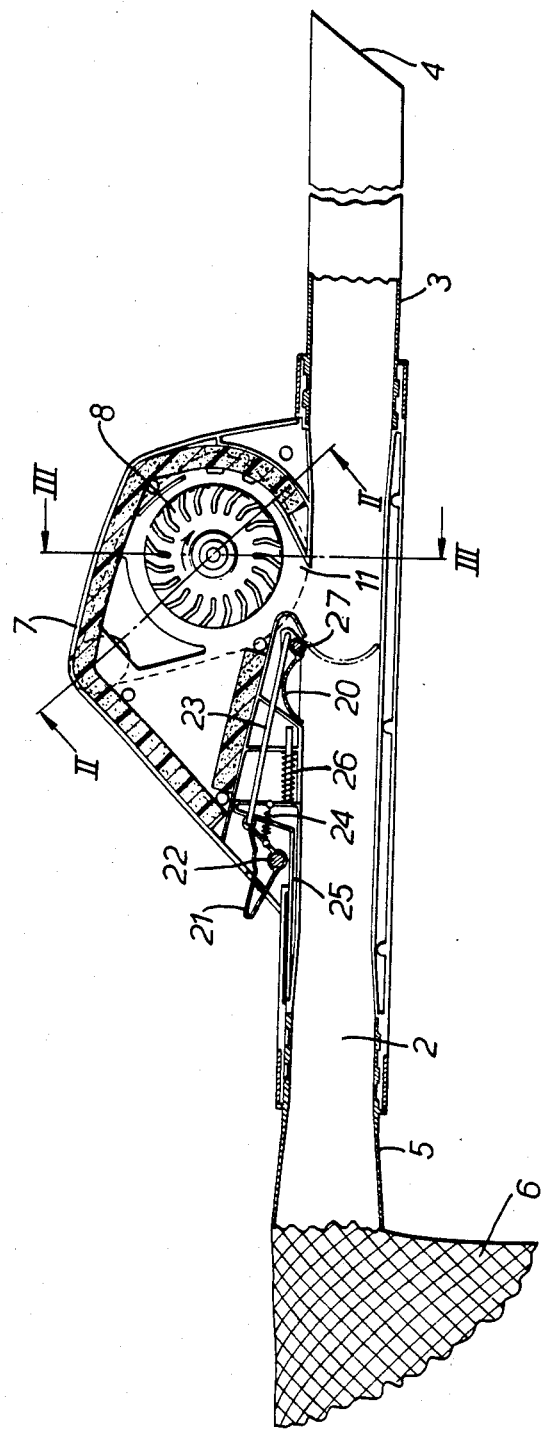
FIG. 1 is a side view, mainly in section, of a debris collecting apparatus embodying the invention.

The debris collecting apparatus 1 shown in FIGS. 1, 2, 3 and 7 is principally intended for collecting garden debris and has a debris conduit 2 of generally rectangular cross-section to one end of which is detachably connected a tube 3 having an operating end 4 and to the other end of which is detachably connected a diffuser 5 having a collecting bag 6 attached thereto. The tube 3 and diffuser 5 may be detachably connected to the conduit 2 by any suitable means, for example by screw threads.

A housing 7 to the side of the debris conduit is lined with acoustic foam and houses a cross flow fan 8 driven by a motor 28 housed in a motor casing 9. A subsidiary air inlet to the fan housing from the motor casing 9 is provided by an aperture 10 and a main air inlet (not shown) is provided in the fan housing approximately opposite the aperture 10. The fan has an outlet 11 through which air is directed into the conduit 2 at an angle of about 30° thereto.

Figure 2:
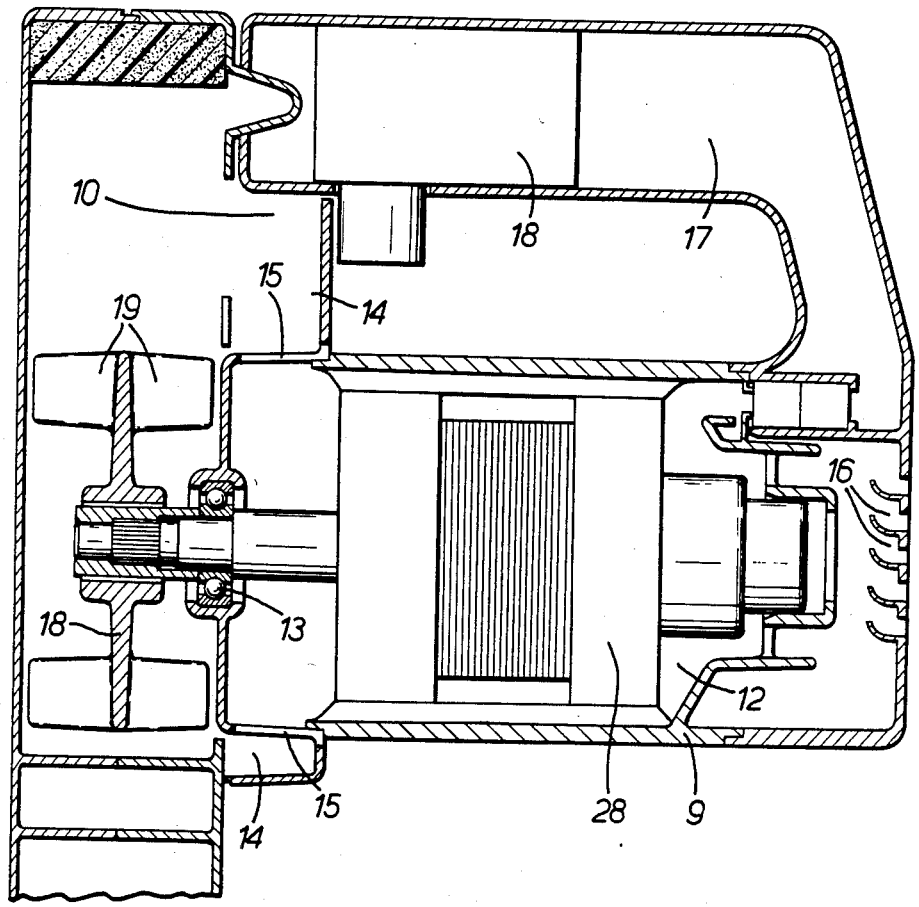
FIG. 2 is a sectional view in the direction of the arrows II—II in FIG. 1.
Figure 3:
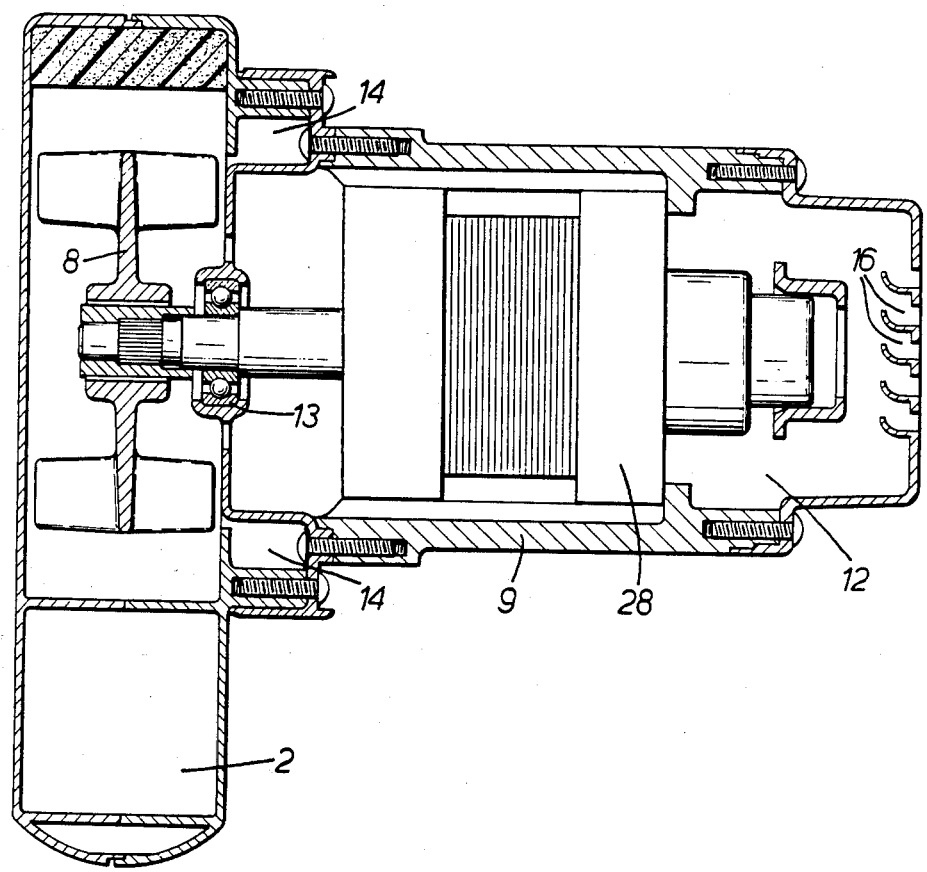
FIG. 3 is a sectional view in the direction of the arrows III—III in FIG. 1.

The motor casing 9, which is secured to the fan housing, has a motor compartment 12 in which the motor 28 (and also, if desired, a motor cooling fan) is located. The motor armature shaft passes through a bearing 13 at the end of the motor casinf and carries the fan 8 at its free end. As can be seen in FIG. 2, the end of the motor compartment adjacent the fan housing is surrounded by an annular air passage 14 which communicates with the motor compartment through slots 15 in the compartment wall. The air passage 14 in turn is connected to the fan housing through the aperture 10. At the opposite end of the motor compartment to the slots 15, air inlet slots 16 are provided.

A handle 17 is fixed to the motor compartment and carries an electric switch 18 for controlling the operation of the apparatus which is powered from the mains supply via a cable (not shown).

The fan 8 is in this particular example a double sided cross-flow fan having twenty blades, indicated by reference numeral 19 on each side.

The collecting bag 6 has an open mesh construction but over the side of the bag which in use lies against a user's body, the bag is rendered impermeable by the provision of a plastics sheet. The bottom of the bag is openable to enable collected debris to be emptied from the bag; the bottom of the bag may for example be open and a resilient strip of 'C' shaped cross-section provided to close the bag.

A valve member 20 is pivotally mounted on a pivot 27 in the side wall of the debris conduit 2 adjacent the outlet 11 of the fan; the valve member 20 is movable between the position shown in solid outline in FIG. 1 to that shown in dotted outline and movement of the valve member is controlled by an actuating lever 21 mounted on a pivot 22 and connected to the valve member 20 by a link 23 pivotally connected at each end. A tension spring 24 biases the lever 21 to the position shown in FIG. 1.

An 'L' shaped member 25 is slidably mounted in a slot in the debris conduit 2 and is biased to the left (as seen in FIG. 1) by a compression spring 26, but with the diffuser 5 and bag 6 connected it is held in the postion shown in FIG. 1. In this position, the member 25 defines the rest position of the actuating lever 21 by virtue of its abutment therewith; if, however, the diffuser 5 is removed the member 25 slides to the left under the bias of the spring 26 and engagement of the member 25 with the lever 21 rotates the valve member 20 into the position shown in dotted outline in FIG. 1.

In operation, with the diffuser 5 attached, the lever 21 in its rest position and the switch 18 depressed to actuate the motor, the fan 8 which rotates clockwise as seen in FIG. 1, draws air through the main air inlet and also through the motor compartment and discharges the air through the outlet 11 into the debris conduit 2. The discharge of air induces a flow of air along the debris conduit from the operating end 4. The user holds the apparatus by the handle 17 with the tube 3 inclined downwardly (a position which the apparatus naturally adopts) and moves the operating end 4 over areas from which debris is to be collected. The debris passes into the conduit through the end 4 and then has a straight and uninterrupted passage into the collecting bag 6.

If the user wishes to use the device in the blowing mode, he merely depresses the free end of the lever 21 thereby rotating the lever and moving the valve member 20 into the position shown in dotted outline. In this position, air discharged through the outlet 11 is turned and directed along the tube 3 and out through the operating end 4. The valve member is positioned so that it defines an extension of the outlet 11 and is curved to assist in the re-directing of the air discharged from the fan.

As already described, when the diffuser 5 and collecting bag 6 are removed, the apparatus can only be used in the blowing mode so that there is no risk of a user being struck by debris flying out of the debris conduit 2.

In the illustrated embodiment the debris conduit is of rectangular cross-section but, alternatively, the conduit may be of circular cross-section.

Figure 4:
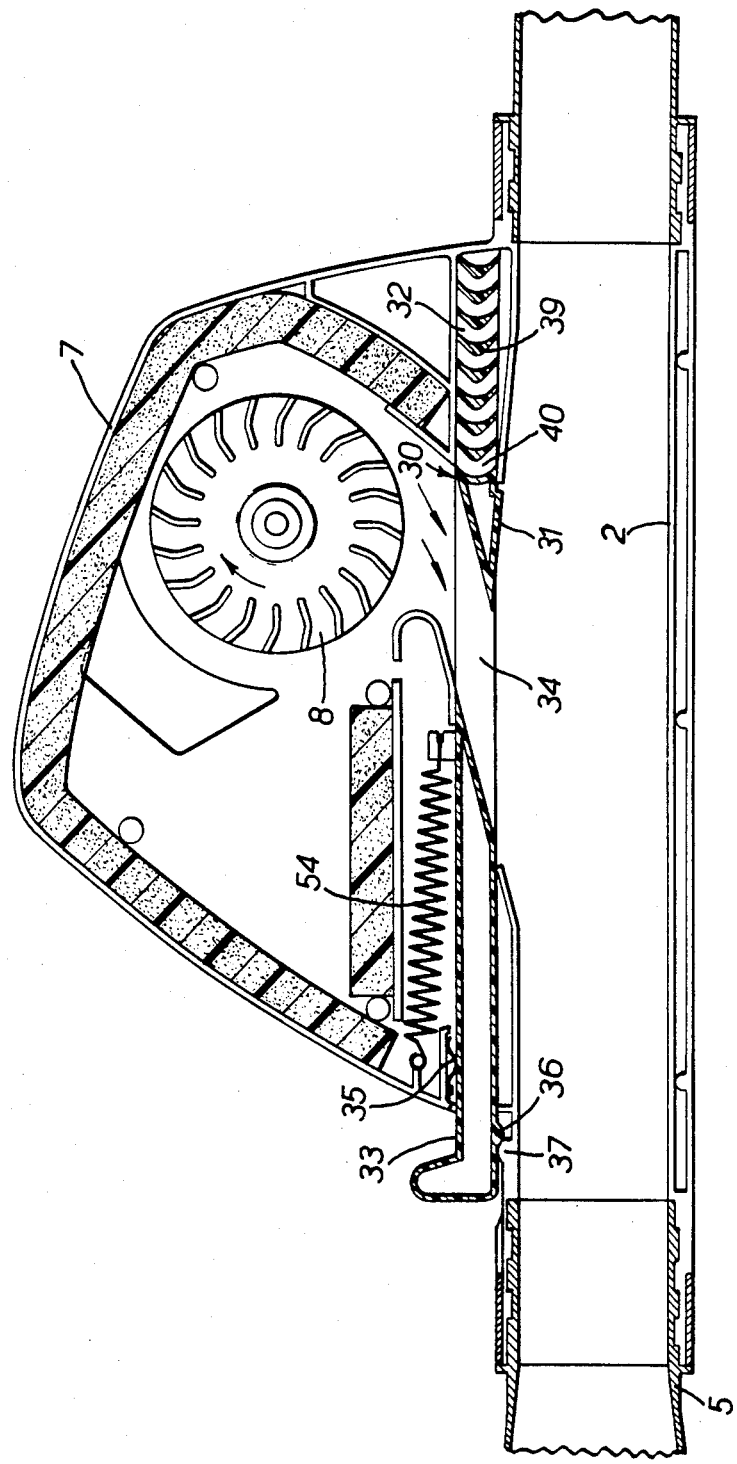
FIG. 4 is a sectional side view of part of another form of debris collecting apparatus embodying the invention.

FIG. 4 shows a modified form of the apparatus of FIG. 1. The description of this embodiment will be confined largely to the features not present in the apparatus of FIG. 1 and it should be understood that the various alternatives described in relation to FIG. 1 are also applicable to the apparatus of FIG. 4. Similar parts are designated by the same reference numerals in FIGS. 1 and 4.

The main feature of the embodiment of FIG. 4 is the use of an air flow guide 30 to control the direction of air flow in the conduit 2 in place of the valve member 20. The air flow guide 30 comprises a wedge shaped part 31 and a vane assembly 32 and is integrally formed with an actuating member 33, with an opening 34 provided between the member 33 and part 31.

The guide 30 is slidably mounted on the top of the debris conduit and the actuating member 33 carries a mounting for one end of a tension spring 54, the other end of which is anchored to the housing 7. A leaf spring 35 stressed between the top face of the actuating member 33 and an opposing face of the housing 7 presses the actuating member 33 downwards and, in the position shown in FIG. 4, the member 33 is held in position with the spring 34 tensioned by engagement of a pip 36 on the actuating member with a rib 37 on the end of the diffuser 5.

The vane assembly 32 is made up of a series of vanes 39 between which passageways 40 are provided. It will be seen that the passageways 40 turn through an angle of the order of 90° in passing through the vane assembly 32.

With the apparatus in the position shown in FIG. 4, it operates in the vacuum mode in substantially the same way as the apparatus of FIG. 1. Thus air is discharged by the fan 8 in the direction of the arrows through the opening 34 and outlet 11 and the discharge of air induces a flow of air along the debris conduit from the operating end 4. The assembly 32 is housed in a recess in the housing 7 and does not affect the air flow although the wedge shaped part 31 does guide the discharge of air into the conduit.

In order to operate the apparatus in the blowing mode, a user lifts the free end of the actuating member 33 against the bias of the leaf spring 35 thereby disengaging the pip 36 from the peripheral rib 37. The actuating member then moves out from the housing under the bias of the tension spring 34 to its limit position in which the vane assembly 32 is located over the outlet 11 and the opening 34 lies over a closed part of the housing 7. In this position, air is discharged by the fan 8 in the direction of the arrows and passes through the passageways 40 in the vane assembly where it is turned and directed into the conduit 2 towards the operating end 4.

It will be seen that if the user removes the diffuser 5 and associated collecting bag, the rib 37 is removed so that the apparatus will always operate in the blowing mode. This makes the apparatus particularly safe as it is not possible to use it accidentally in the vacuum mode without the diffuser and associated collecting bag in place.

The arrangement described above with reference to FIG. 4 has certain advantages. In both the vacuum and blowing modes of the apparatus, the debris conduit is able to provide smooth boundary walls thereby reducing to a minimum the risk of the conduit being blocked. The arrangement can be used on ducts of different shapes and sizes so that, if desired, a duct of relatively large cross-section can be used thus reducing again the likelihood of blockages.

Figure 5:
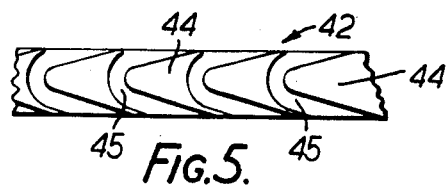
FIG. 5 is a side view of a vane assembly that may be employed in the apparatus of FIG. 4.
Figure 6:
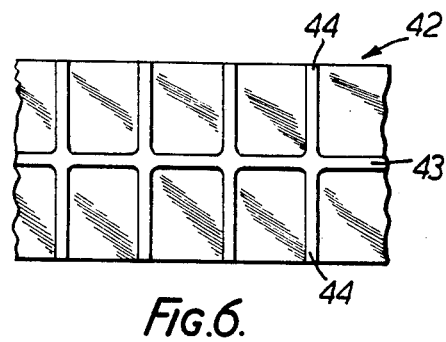
FIG. 6 is a plan view of the vane assembly of FIG. 5
Figure 7:
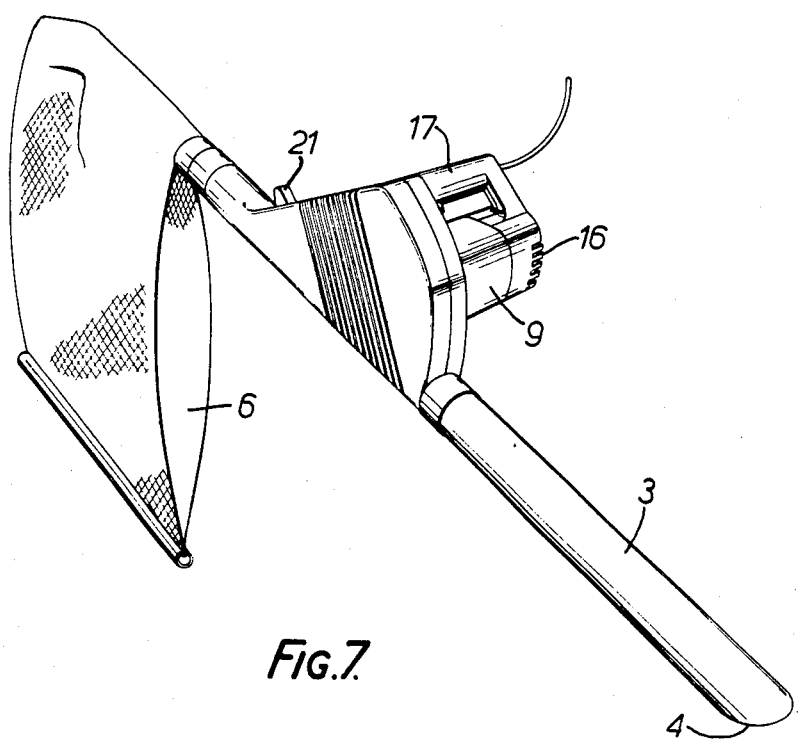
FIG. 7 is a perspective view of the debris collecting apparatus of FIG. 1.

FIGS. 5 and 6 show an alternative form of vane assembly 42 that may be used in the apparatus. The assembly 42 is made up of a central web 43 from each side of which vanes 44 extend. Passageways 45 are provided between adjacent vanes and these turn through an angle of about 150° from one end to the other. With this vane assembly the fan is arranged to discharge air at an angle of about 15° to the longitudinal axis of the debris conduit. The angle of entry of air into the conduit can be selected by experiment to give the optimum performance for the particular shape of debris conduit employed.

What is claimed is:

1. A debris collecting apparatus, including:
   a debris conduit one end of which is an operating end and the other end of which is a collecting end;
   an impeller arranged to discharge air into the conduit through an opening therein in a region where the conduit is devoid of any sudden and substantial change in direction;
   a switch arrangement to switch the air flow between a first "vacuum" flow in which the air discharged from the impeller induces an air flow in the debris conduit from the operating end to the collecting end and a second "blowing" flow in which air is discharged from the impeller through the operating end;
   the switch arrangement comprising an air flow guide movable between a first position corresponding to "vacuum" flow in which the air discharged from the impeller induces an air flow in the debris conduit from the operating end to the collecting end and a second position corresponding to "blowing" flow in which air is discharged from the impeller through the air flow guide into the conduit and is diverted by the guide to flow towards the operating end of the conduit;
   the air flow guide comprising one or more vanes carried on a member slidably mounted in a wall of the conduit, said one or more vanes defining at least one passage through said member, said passage communicating with said opening in said second position with said one or more vanes diverting the air discharged from said impeller towards and to said operating end; and
   said member having an aperture therethrough at a location adjacent said passage, said aperture communicating with said opening in said first position and allowing the air discharged from said impeller to flow towards and to said collecting end.

2. A debris collecting apparatus, including:
   a debris conduit one end of which is an operating end and the other end of which is a collecting end, said debris conduit being straight and extending unobstructed between said operating end and said collecting end;
   an impeller arranged to discharge air into the conduit in a region where the conduit is devoid of any sudden and substantial change in direction;
   a switch arrangement to switch the air flow between a first "vacuum" flow in which the air discharged from the impeller induces an air flow in the debris conduit from the operating end to the collecting end and a second "blowing" flow in which air is discharged from the impeller through the operating end;
   the switch arrangement comprising an air flow guide movable between a first position corresponding to "vacuum" flow in which the air discharged from the impeller induces an air flow in the debris conduit from the operating end to the collecting end and a second position corresponding to "blowing" flow in which air is discharged from the impeller through the air flow guide into the conduit and is diverted by the guide to flow towards the operating end of the conduit;
   the air flow guide comprising at least one air diverting vane carried on a member slidably mounted in a wall of the conduit, said member leaving said debris conduit unobstructed between said operating end and said collecting end in both said first and second positions;
   the conduit wall having an opening through which air from said impeller is discharged into the conduit towards said collecting end;
   the air flow guide leaving the opening substantially unblocked in its first position to allow the air to be discharged from said impeller towards said collecting end; and the at least one vane of the air flow guide being located in the opening in the second position of the guide and diverting air discharged through said opening from said impeller towards said operating end.

3. An apparatus according to claim 2, in which, in its first position, a part of the air flow guide is arranged to guide air discharged into the debris conduit.

4. A debris collecting apparatus, comprising:
a debris conduit one end of which is an operating end and the other end of which is a collecting end;
an impeller arranged to discharge air into the conduit;
an air flow guide movable between a first position corresponding to "vacuum" flow in which the air discharged from the impeller induces an air flow in the debris conduit from the operating end to the collecting end and a second position corresponding to "blowing" flow in which air is discharged from the impeller through the air flow guide into the conduit and is diverted by the guide to flow towards the operating end of the conduit;
resilient means for biasing said air flow guide to said second position;
a collecting bag detachably connected to said collecting end and including means for releasably holding said air flow guide in said first position; and
manually operable means for moving said air flow guide to said second position when said bag is connected to said collecting end.

5. A debris collecting and blowing apparatus, comprising:
a fan housing connected to a motor housing;
an electric motor mounted in said motor housing;
a fan disposed in said fan housing and connected to said motor for rotation thereby;
a handle connected to said motor housing;
a switch associated with said handle for actuating said motor;
said fan housing having an air discharge outlet through which air from said fan is discharged;
a straight elongate debris conduit having an open operating end and a collecting end;
an opening in a side wall of said debris conduit intermediate said ends thereof, said debris conduit being connected to said fan housing with said air discharge outlet communicating with said opening;
said air discharge outlet being disposed to direct air from said fan into said debris conduit towards said collecting end at an acute angle to the lengthwise direction of said debris conduit;
a valve member associated with said opening and movable between a "vacuum" position, in which the air discharged from said fan flows to said collecting end and induces an air flow in said debris conduit from said operating end to said collecting end to create a suction action at said operating end, and a "blowing" position in which the air discharged from said fan is re-directed in direction by said valve member and flows to said operating end to create a blowing action thereat;
resilient means for biasing said valve member towards said "blowing" position;
actuating means for moving said valve member to said "vacuum" position;
a debris collecting bag having an inlet detachably connected to said collecting end; and means, associated with said inlet, for retaining said valve member in said "vacuum" position when said debris collecting bag is connected to said collecting end, and for enabling said resilient means to automatically move said valve member to said "blowing" position when said debris collecting bag is detached from said collecting end.

6. A debris collecting and blowing apparatus, comprising:
a fan housing connected to a motor housing;
an electric motor mounted in said motor housing;
a fan disposed in said fan housing and connected to said motor for rotation thereby;
a handle connected to said motor housing;
a switch associated with said handle for actuating said motor;
said fan housing having an air discharge outlet through which air from said fan is discharged;
a straight elongate debris conduit having an open operating end and a collecting end;
an opening in a side wall of said debris conduit intermediate said ends thereof, said debris conduit being connected to said fan housing with said air discharge outlet communicating with said opening;
said air discharge outlet being disposed to direct air from said fan into said debris conduit towards said collecting end at an acute angle to the lengthwise direction of said debris conduit;
a valve member associated with said opening and movable between a "vacuum" position, in which the air discharged from said fan flows to said collecting end and induces an air flow in said debris conduit from said operating end to said collecting end to create a suction action at said operating end, and a "blowing" position in which the air discharged from said fan is re-directed in direction by said valve member and flows to said operating end to create a blowing action thereat;
resilient means for biasing said valve member towards said "blowing" position;
actuating means for moving said valve member to said "vacuum" position;
said valve member being pivotally mounted in said debris conduit adjacent said opening and between said opening and said collecting end;
said valve member extending transversely across said debris conduit in said "blowing" position; and
said valve member being concavely curved to assist in re-directing the air flow in said "blowing" position, and in said "vacuum" position being located in a recess in the side wall of said debris conduit out of the air flow through said conduit to said collecting end, said recess being adjacent said opening and disposed between said opening and said collecting end.

7. A debris collecting and blowing apparatus, comprising:
a fan housing connected to a motor housing;
an electric motor mounted in said motor housing;
a fan disposed in said fan housing and connected to said motor for rotation thereby;
a handle connected to said motor housing;
a switch associated with said handle for actuating said motor;
said fan housing having an air discharge outlet through which air from said fan is discharged;
a straight elongate debris conduit having an open operating end and a collecting end;

an opening in a side wall of said debris conduit intermediate said ends thereof, said debris conduit being connected to said fan housing with said air discharge outlet communicating with said opening;

said air discharge outlet being disposed to direct air from said fan into said debris conduit towards said collecting end at an acute angle to the lengthwise direction of said debris conduit;

a valve member associated with said opening and movable between a "vacuum" position, in which the air discharged from said fan flows to said collecting end and induces an air flow in said debris conduit from said operating end to said collecting end to create a suction action at said operating end, and a "blowing" position in which the air discharged from said fan is re-directed in direction by said valve member and flows to said operating end to create a blowing action thereat;

resilient means for biasing said valve member towards said "blowing" position;

actuating means for moving said valve member to said "vacuum" position; and said valve member being slidable in the lengthwise direction of said debris conduit and having an aperture, which communicates with said opening in said "vacuum" position, and a plurality of vanes defining passages therebetween, said passages communicating with said opening in said "blowing" position.

8. A debris collecting and blowing apparatus, comprising:

a fan housing connected to a motor housing;

an electric motor mounted in said motor housing;

a fan disposed in said fan housing and connected to said motor for rotation thereby;

a handle connected to said motor housing;

a switch associated with said handle for actuating said motor;

said fan housing having an air discharge outlet through which air from said fan is discharged;

a straight elongate debris conduit having an open operating end and a collecting end;

an opening in a side wall of said debris conduit intermediate said ends thereof, said debris conduit being connected to said fan housing with said air discharge outlet communicating with said opening;

said air discharge outlet being disposed to direct air from said fan into said debris conduit towards said collecting end at an acute angle to the lengthwise direction of said debris conduit;

a valve member associated with said opening and movable between a "vacuum" position, in which the air discharged from said fan flows to said collecting end and induces an air flow in said debris conduit from said operating end to said collecting end to create a suction action at said operating end, and a "blowing" position in which the air discharged from said fan is re-directed in direction by said valve member and flows to said operating end to create a blowing action thereat;

resilient means for biasing said valve member towards said "blowing" position;

actuating means for moving said valve member to said "vacuum" position;

said motor housing having an air inlet and said fan housing having an air inlet communicating with said motor housing air inlet, air being drawn by said fan through said motor housing before being discharged by said fan into said debris conduit; and a collecting bag detachably connected to said collecting end and cooperative with said actuating means, attachment of said bag to said collecting end actuating said actuating means to move said valve member to said "vacuum" position, and detachment of said bag from said collecting end allowing said resilient means to move said valve member to said "blowing" position.

9. The debris collecting apparatus of claim 4, further comprising:

an electric motor drivingly connected to said impeller; and an impeller housing in which said impeller is rotatably mounted, said housing being lined with acoustic foam.

10. The debris collecting apparatus of claim 4, wherein said air flow guide is slidably mounted.

11. The debris collecting apparatus of claim 4, wherein said air flow guide is slidably mounted in a wall of said debris conduit and has at least one vane, said vane diverting towards said operating end air discharged from the impeller in said second position of said air flow guide.

12. A debris collecting and blowing apparatus, comprising:

a debris conduit one end of which is an operating end and the other end of which is a collecting end;

an impeller arranged to discharge air into the conduit;

an air flow switch arrangement having a member movable between a first position corresponding to "vacuum" flow in which the air discharged from the impeller induces an air flow in the debris conduit from the operating end to the collecting end and a second position corresponding to "blowing" flow in which air is discharged from the impeller into the conduit and is diverted by said member to flow towards the operating end of the conduit;

resilient means for biasing said member to said second position;

a collecting bag detachably connected to said collecting end and including means for releasably holding said member in said first position; and manually operable means for moving said member to said second position when said bag is connected to said collecting end.

13. The apparatus of claim 12, wherein said member is pivotal.

14. The apparatus of claim 1, wherein said debris conduit is elongate and straight, and in both the first and second positions of said air flow guide said debris conduit is unobstructed between said operating end and said collecting end.

* * * * *